US009779312B2

(12) United States Patent
Sakagami et al.

(10) Patent No.: US 9,779,312 B2
(45) Date of Patent: Oct. 3, 2017

(54) ENVIRONMENT RECOGNITION SYSTEM

(71) Applicant: HONDA MOTOR CO., LTD., Tokyo (JP)

(72) Inventors: Yoshiaki Sakagami, Saitama (JP); Taku Osada, Saitama (JP); Kensuke Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 15/007,276

(22) Filed: Jan. 27, 2016

(65) Prior Publication Data
US 2016/0224849 A1 Aug. 4, 2016

(30) Foreign Application Priority Data

Jan. 30, 2015 (JP) .................. 2015-017749
Mar. 20, 2015 (JP) .................. 2015-058756

(51) Int. Cl.
G06K 9/00 (2006.01)
G06F 17/30 (2006.01)
G06K 9/72 (2006.01)

(52) U.S. Cl.
CPC ... G06K 9/00805 (2013.01); G06F 17/30268 (2013.01); G06K 9/72 (2013.01)

(58) Field of Classification Search
None
See application file for complete search history.

(56) References Cited

U.S. PATENT DOCUMENTS

| 8,442,385 B2* | 5/2013 | Morita ................... G11B 27/28 |
| | | 386/239 |
| 9,509,333 B2* | 11/2016 | Kataoka ................. H03M 7/30 |
| 2004/0030695 A1* | 2/2004 | Lyudovyk ......... G06F 17/30899 |
| 2008/0037949 A1* | 2/2008 | Morita ................... G11B 27/28 |
| | | 386/278 |

FOREIGN PATENT DOCUMENTS

| DE | 199 38 691 | 2/2001 |
| DE | 101 32 386 | 1/2003 |
| DE | 103 41 753 | 4/2005 |
| DE | 10 2004 050 597 | 4/2006 |
| JP | 2012-179929 | 9/2012 |

OTHER PUBLICATIONS

German Office Action dated Nov. 25, 2016, English translation included, 10 pages.
German Search Report dated Nov. 23, 2016, English abstract included, 18 pages.

* cited by examiner

Primary Examiner — Nancy Bitar
(74) Attorney, Agent, or Firm — Rankin, Hill & Clark LLP

(57) ABSTRACT

Provided is a system capable of further reducing risk such as a contact between a moving body such as a vehicle and a traffic participant present around the moving body. According to an environment recognition system (1) of the present invention, a database (10) stores each of a plurality of reference symbol strings describing the state of an environmental element constituting each of a plurality of scenes assumed to be around the moving body. A first arithmetic processing element (11) detects a scene around the moving body and generates a symbol string describing the state of the environmental element constituting the detected scene. A second arithmetic processing element (12) evaluates simi- (Continued)

larity between the symbol string and each of the plurality of reference symbol strings stored in the database (10).

7 Claims, 12 Drawing Sheets

FIG.3A

FIG.3B

| SCENE NAME: BICYCLE | | |
|---|---|---|
| PLACE | | |
| ROAD SHAPE | STRAIGHT LINE (2) | |
| SPEED RANGE | RESIDENTIAL AREA | |
| PEDESTRIAN CROSSING | NONE | |
| SLOPE | NONE | |
| CONSTRUCTION | NONE | |
| CROWDED | NONE | |
| WEATHER | FINE | |
| DAY-NIGHT | DAY | |
| TRAFFIC PARTICIPANTS | | |
| | FIRST | SECOND |
| TYPE | BICYCLE | CAR |
| POSITION | 1-1 CENTER | 1-1 LEFT SIDE |
| BEHAVIOR | MOVING FORWARD | STOPPED |
| OTHER TRAFFIC PARTICIPANTS | | |
| TYPE | CAR | BICYCLE |
| RPOSITION | LEFT SIDE | RIGHT SIDE |
| BEHAVIOR | PASSING | NULL |
| DIRECTION | SAME | SAME |
| ME (OWN VEHICLE) | | |
| TYPE | CAR | |
| POSITION | ON LANE MARK | |
| BEHAVIOR | MOVING FORWARD | |
| OTHER TRAFFIC PARTICIPANTS | FIRST | SECOND |
| TYPE | BICYCLE | CAR |
| RPOSITION | LEFT FRONT | LEFT FRONT |
| DIRECTION | SAME | SAME |
| BEHAVIOR | FOLLOWING | PASSING |

FIG. 4A

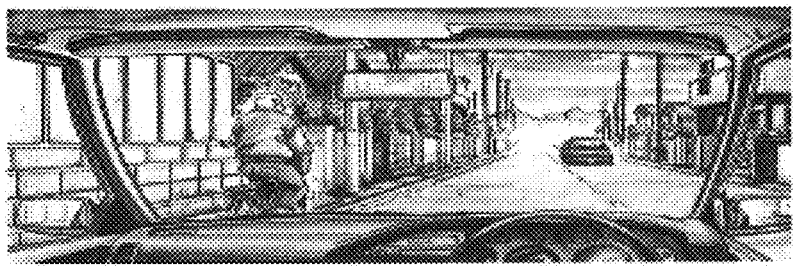

FIG. 4B

| SCENE NAME: HEAD-ON COLLISION ||
|---|---|
| PLACE ||
| ROAD SHAPE | STRAIGHT LINE (1) |
| SPEED RANGE | RESIDENTIAL AREA |
| PEDESTRIAN CROSSING | NONE |
| SLOPE | NONE |
| CONSTRUCTION | NONE |
| CROWDED | NONE |
| WEATHER | FINE |
| DAY-NIGHT | DAY |
| TRAFFIC PARTICIPANTS ||
|  | FIRST | SECOND |
| TYPE | BICYCLE | CAR |
| POSITION | 1-1 LEFT SIDE | 1-1 CENTER |
| BEHAVIOR | MOVING FORWARD | MOVING FORWARD |
| OTHER TRAFFIC PARTICIPANTS |||
| TYPE | CAR | BICYCLE |
| RPOSITION | RIGHT FRONT | RIGHT FRONT |
| BEHAVIOR | NULL | NULL |
| DIRECTION | OPPOSITE | OPPOSITE |
| ME (OWN VEHICLE) |||
| TYPE | CAR ||
| POSITION | 1-1 CENTER ||
| BEHAVIOR | MOVING FORWARD ||
| OTHER TRAFFIC PARTICIPANTS | FIRST | SECOND |
| TYPE | BICYCLE | CAR |
| RPOSITION | LEFT FRONT | RIGHT FRONT |
| DIRECTION | SAME | OPPOSITE |
| BEHAVIOR | PASSING | NULL |

FIG.5A

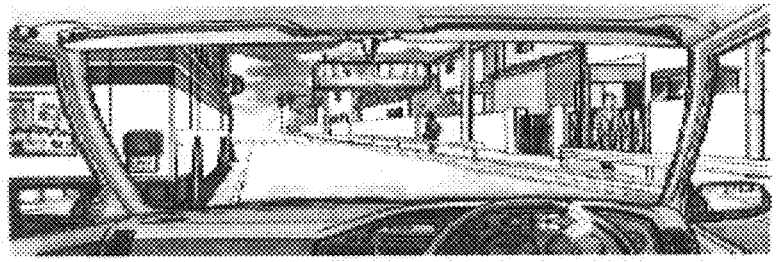

FIG.5B

| SCENE NAME: PEDESTRIAN | | |
|---|---|---|
| PLACE | | |
| ROAD SHAPE | STRAIGHT LINE (2) | |
| SPEED RANGE | URBAN DISTRICT, RESIDENTIAL AREA | |
| PEDESTRIAN CROSSING | NONE | |
| SLOPE | NONE | |
| CONSTRUCTION | NONE | |
| CROWDED | NONE | |
| WEATHER | FINE | |
| DAY-NIGHT | DAY | |
| TRAFFIC PARTICIPANTS | | |
|  | FIRST | SECOND |
| TYPE | BUS/LARGE VEHICLE | PEDESTRIAN |
| POSITION | 1-1 LEFT SIDE | 1-2 OUTSIDE |
| BEHAVIOR | STOPPED | MOVING FORWARD |
| OTHER TRAFFIC PARTICIPANTS | | |
| TYPE | PEDESTRIAN | BUS |
| RPOSITION | RIGHT FRONT | LEFT REAR |
| BEHAVIOR | NULL | NULL |
| DIRECTION | OPPOSITE | OPPOSITE |
| ME (OWN VEHICLE) | | |
| TYPE | CAR | |
| POSITION | ON LANE MARK | |
| BEHAVIOR | MOVING FORWARD | |
| OTHER TRAFFIC PARTICIPANTS | FIRST | SECOND |
| TYPE | BUS | PEDESTRIAN |
| RPOSITION | LEFT FRONT | RIGHT FRONT |
| DIRECTION | SAME | OPPOSITE |
| BEHAVIOR | PASSING | STOPPED |

FIG.6A

FIG.6B

| SCENE NAME: INTERSECTION | |  |
|---|---|---|
| PLACE | | |
| ROAD SHAPE | INTERSECTION (4) (INSIDE STRAIGHT LANE, OUTSIDE STRAIGHT LANE) | |
| SPEED RANGE | SUBURB | |
| PEDESTRIAN CROSSING | 1, 2, 3, 4 | |
| SLOPE | NONE | |
| CONSTRUCTION | NONE | |
| CROWDED | NONE | |
| WEATHER | FINE | |
| DAY-NIGHT | DAY | |
| TRAFFIC PARTICIPANTS | | |
| | FIRST | SECOND |
| TYPE | TRUCK/LARGE VEHICLE/CAR | - |
| POSITION | 3-2 CENTER | - |
| BEHAVIOR | MOVING FORWARD | - |
| OTHER TRAFFIC PARTICIPANTS | | |
| TYPE | NULL | - |
| RPOSITION | NULL | - |
| BEHAVIOR | NULL | - |
| DIRECTION | NULL | - |
| ME (OWN VEHICLE) | | |
| TYPE | CAR | |
| POSITION | 1-1 CENTER | |
| BEHAVIOR | STOPPED | |
| OTHER TRAFFIC PARTICIPANTS | FIRST | SECOND |
| TYPE | TRUCK/LARGE VEHICLE | - |
| RPOSITION | RIGHT FRONT | - |
| DIRECTION | OPPOSITE | - |
| BEHAVIOR | WAITING | - |

FIG.7A

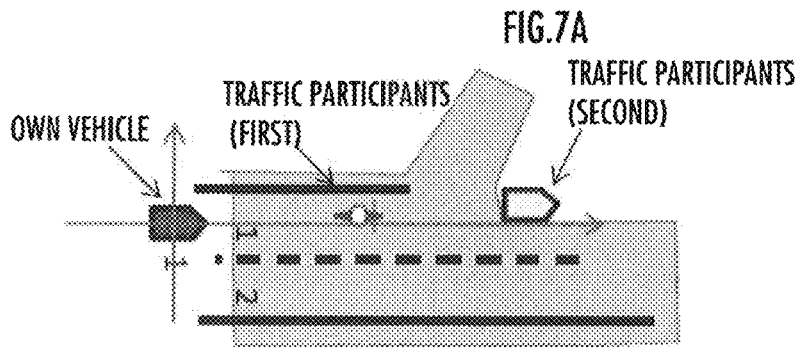

FIG.7B

| ENVIRONMENT RECOGNITION RESULT 1 ||
|---|---|
| PLACE ||
| ROAD SHAPE | STRAIGHT LINE (1) |
| SPEED RANGE | RESIDENTIAL AREA |
| PEDESTRIAN CROSSING | NONE |
| SLOPE | NONE |
| CONSTRUCTION | NONE |
| CROWDED | NONE |
| WEATHER | FINE |
| DAY-NIGHT | DAY |

| TRAFFIC PARTICIPANTS |||
|---|---|---|
|  | FIRST | SECOND |
| TYPE | BICYCLE | CAR |
| POSITION | 1-1 LEFT SIDE | 1-1 LEFT SIDE |
| BEHAVIOR | MOVING FORWARD | STOPPED |
| OTHER TRAFFIC PARTICIPANTS |||
| TYPE | CAR | BICYCLE |
| RPOSITION | FRONT | REAR |
| BEHAVIOR | NULL | NULL |
| DIRECTION | SAME | SAME |

| ME (OWN VEHICLE) |||
|---|---|---|
| TYPE | CAR ||
| POSITION | 1-1 CENTER ||
| BEHAVIOR | MOVING FORWARD ||
| OTHER TRAFFIC PARTICIPANTS | FIRST | SECOND |
| TYPE | BICYCLE | CAR |
| RPOSITION | LEFT FRONT | LEFT FRONT |
| DIRECTION | SAME | NULL |
| BEHAVIOR | FOLLOWING | NULL |

FIG.8A

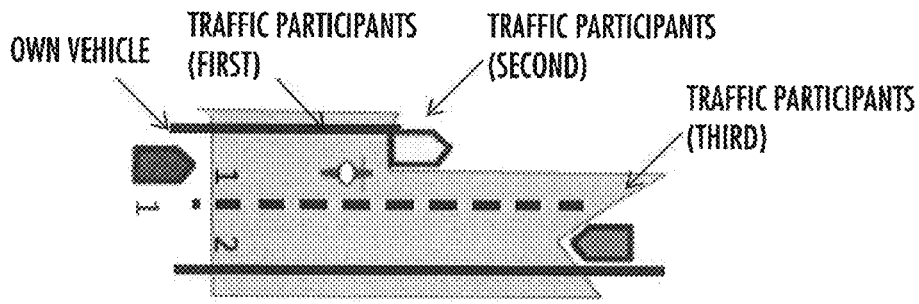

FIG.8B

| ENVIRONMENT RECOGNITION RESULT 2 |||||||
|---|---|---|---|---|---|---|
| PLACE |||||||
| ROAD SHAPE | STRAIGHT LINE (1) ||||||
| SPEED RANGE | RESIDENTIAL AREA ||||||
| PEDESTRIAN CROSSING | NONE ||||||
| SLOPE | NONE ||||||
| CONSTRUCTION | NONE ||||||
| CROWDED | NONE ||||||
| WEATHER | FINE ||||||
| DAY-NIGHT | DAY ||||||
| TRAFFIC PARTICIPANTS |||||||
|  | FIRST || SECOND || THIRD ||
| TYPE | BICYCLE || CAR || CAR ||
| POSITION | 1-1 CENTER || 1-1 LEFT SIDE || 1-2 CENTER ||
| BEHAVIOR | MOVING FORWARD || STOPPED || MOVING FORWARD ||
| OTHER TRAFFIC PARTICIPANTS |||||||
|  | SECOND | THIRD | FIRST | THIRD | FIRST | SECOND |
| TYPE | CAR | CAR | BICYCLE | CAR | BICYCLE | CAR |
| RPOSITION | LEFT FRONT | RIGHT FRONT | RIGHT REAR | RIGHT FRONT | RIGHT FRONT | RIGHT FRONT |
| BEHAVIOR | NULL | NULL | NULL | NULL | NULL | NULL |
| DIRECTION | SAME | OPPOSITE | SAME | OPPOSITE | OPPOSITE | OPPOSITE |
| ME (OWN VEHICLE) |||||||
| TYPE | CAR ||||||
| POSITION | 1-1 CENTER ||||||
| BEHAVIOR | MOVING FORWARD ||||||
| OTHER TRAFFIC PARTICIPANTS | FIRST || SECOND || THIRD ||
| TYPE | BICYCLE || CAR || CAR ||
| RPOSITION | LEFT FRONT || LEFT FRONT || RIGHT FRONT ||
| DIRECTION | SAME || NULL || OPPOSITE ||
| BEHAVIOR | FOLLOWING || NULL || NULL ||

FIG. 9A

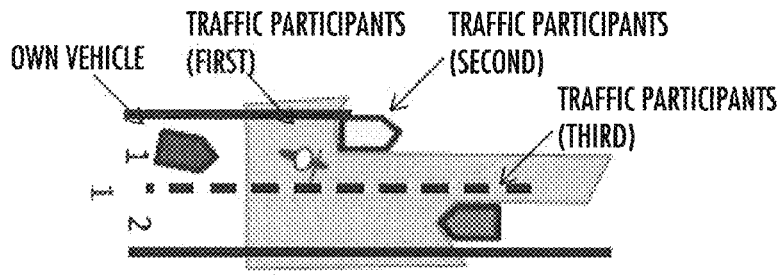

FIG. 9B

| ENVIRONMENT RECOGNITION RESULT 3 | | | | | |
|---|---|---|---|---|---|
| PLACE | | | | | |
| ROAD SHAPE | STRAIGHT LINE (1) | | | | |
| SPEED RANGE | RESIDENTIAL AREA | | | | |
| PEDESTRIAN CROSSING | NONE | | | | |
| SLOPE | NONE | | | | |
| STRUCTURE | NONE | | | | |
| CROWDED | NONE | | | | |
| WEATHER | FINE | | | | |
| DAY-NIGHT | DAY | | | | |
| TRAFFIC PARTICIPANTS | | | | | |
| | FIRST | | SECOND | | THIRD |
| TYPE | BICYCLE | | CAR | | CAR |
| POSITION | 1-1 RIGHT SIDE | | 1-1 LEFT SIDE | | 1-2 CENTER |
| BEHAVIOR | MOVING FORWARD | | STOPPED | | MOVING FORWARD |
| OTHER TRAFFIC PARTICIPANTS | | | | | |
| | SECOND | THIRD | FIRST | THIRD | FIRST | SECOND |
| TYPE | CAR | CAR | BICYCLE | CAR | BICYCLE | CAR |
| RPOSITION | LEFT FRONT | RIGHT FRONT | RIGHT REAR | RIGHT FRONT | RIGHT FRONT | RIGHT FRONT |
| BEHAVIOR | PASSING | NULL | NULL | NULL | NULL | NULL |
| DIRECTION | SAME | OPPOSITE | SAME | OPPOSITE | OPPOSITE | OPPOSITE |
| ME (OWN VEHICLE) | | | | | |
| TYPE | CAR | | | | |
| POSITION | 1-1 RIGHT SIDE | | | | |
| BEHAVIOR | MOVING FORWARD | | | | |
| OTHER TRAFFIC PARTICIPANTS | FIRST | | SECOND | | THIRD |
| TYPE | BICYCLE | | CAR | | CAR |
| RPOSITION | LEFT FRONT | | LEFT FRONT | | RIGHT FRONT |
| DIRECTION | SAME | | NULL | | OPPOSITE |
| BEHAVIOR | PASSING | | PASSING | | NULL |

FIG.10A

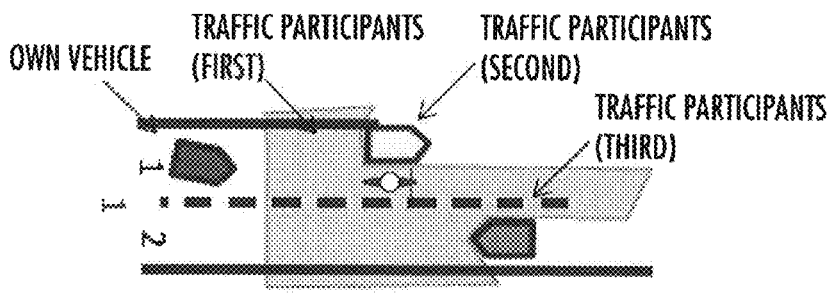

FIG.10B

| ENVIRONMENT RECOGNITION RESULT 4 ||||||
|---|---|---|---|---|---|
| PLACE ||||||
| ROAD SHAPE | STRAIGHT LINE (1) |||||
| SPEED RANGE | RESIDENTIAL AREA |||||
| PEDESTRIAN CROSSING | NONE |||||
| SLOPE | NONE |||||
| STRUCTURE | NONE |||||
| CROWDED | NONE |||||
| WEATHER | FINE |||||
| DAY-NIGHT | DAY |||||
| TRAFFIC PARTICIPANTS ||||||
| | FIRST || SECOND || THIRD |
| TYPE | BICYCLE || CAR || CAR |
| POSITION | 1-1 RIGHT SIDE || 1-1 LEFT SIDE || 1-2 CENTER |
| BEHAVIOR | MOVING FORWARD || STOPPED || MOVING FORWARD |
| OTHER TRAFFIC PARTICIPANTS ||||||
| | SECOND | THIRD | FIRST | THIRD | FIRST | SECOND |
| TYPE | CAR | CAR | BICYCLE | CAR | BICYCLE | CAR |
| RPOSITION | LEFT | RIGHT FRONT | RIGHT | RIGHT FRONT | RIGHT FRONT | RIGHT FRONT |
| BEHAVIOR | PASSING | NULL | NULL | NULL | NULL | NULL |
| DIRECTION | SAME | OPPOSITE | SAME | OPPOSITE | OPPOSITE | OPPOSITE |
| ME (OWN VEHICLE) ||||||
| TYPE | CAR |||||
| POSITION | 1-1 RIGHT SIDE |||||
| BEHAVIOR | STOPPED |||||
| OTHER TRAFFIC PARTICIPANTS | FIRST || SECOND || THIRD |
| TYPE | BICYCLE || CAR || CAR |
| RPOSITION | LEFT FRONT || LEFT FRONT || RIGHT FRONT |
| DIRECTION | SAME || SAME || OPPOSITE |
| BEHAVIOR | PASSING || PASSING || NULL |

ENVIRONMENT RECOGNITION SYSTEM

BACKGROUND OF THE INVENTION

Field of the Invention

The present invention relates to a technique of detecting an environment of a moving body.

Description of the Related Art

There has been suggested a technical method of detecting the presence of a traffic participant such as a passerby or any other vehicle around an own vehicle by using a sensor such as a radar or an imaging device mounted on the own vehicle and predicting the possibility of contact between the own vehicle and the traffic participant on the basis of the relative position and relative speed (including the moving direction) of the own vehicle and the detected traffic participant (for example, refer to Patent Document 1).

[Patent Document 1] Japanese Patent Application Laid-Open No. 2012-179929

In the case, however, where the presence of the traffic participant around the own vehicle is suddenly detected such as a case where a person hiding behind a large vehicle having been parked or stopped in front of the own vehicle abruptly appears, it is difficult to predict the possibility of contact between the own vehicle and the traffic participant. This may lead to a difficulty in the vehicle behavior control for avoiding the contact between the own vehicle and the traffic participant present around the own vehicle, such as the braking and steering control of the own vehicle based on the prediction result.

SUMMARY OF THE INVENTION

Therefore, it is an object of the present invention to provide a system capable of further reducing risk such as contact between a moving body such as a vehicle and a traffic participant present around the moving body.

According to an aspect of the present invention, there is provided an environment recognition system including: a database which stores each of a plurality of reference symbol strings describing a state of an environmental element constituting each of a plurality of scenes assumed to be around a moving body; a first arithmetic processing element which detects a scene around the moving body and generates a symbol string describing the state of the environmental element constituting the scene; and a second arithmetic processing element which evaluates similarity between the symbol string generated by the first arithmetic processing element and each of the plurality of reference symbol strings stored in the database.

According to the environment recognition system of the present invention, whether the probability that each of the plurality of reference scenes described by the plurality of reference symbol strings has just appeared is high or low is detected according to the evaluation result of the similarity to the symbol strings as an environment recognition result. Thereby, in the light of the states of the traffic participants or the like as the environmental elements constituting a reference scene having the probability of appearance around the moving body, risk such as a contact between the moving body and the traffic participant is reliably reduced.

In the environment recognition system according to the present invention, preferably the second arithmetic processing element selects a reference symbol string having the highest current value of the similarity or the highest cumulative value for the latest specified number of times as the current reference symbol string, and calculates a potential risk of the moving body based on at least some symbols constituting the selected reference symbol string according to a data table stored in the database or a specification rule defined by a function.

According to the environment recognition system having the above configuration, the potential risk of the moving body is evaluated according to the reference scene relatively highly probable to appear around the moving body in the light of the detected scene, and therefore the risk to the moving body is reliably reduced by using the evaluation result.

In the environment recognition system of the present invention, preferably the second arithmetic processing element evaluates the potential risk of the moving body on based on a symbol describing at least one of the type, position, and behavior of a traffic participant as the environmental element as the at least some symbols.

According to the environment recognition system having the above configuration, the risk to the moving body is reliably reduced by using the evaluation result of the potential risk to the moving body in the light of the behavior or the like of the traffic participant.

In the environment recognition system of the present invention, preferably the first arithmetic processing element extracts a location on a deep side when viewed from the moving body, as a caution needed location, among objects present in a movable region of the moving body or adjacent thereto in the scene; and the second arithmetic processing element evaluates the potential risk of the moving body based on at least either one of positions and a number of caution needed locations extracted by the first arithmetic processing element in addition to the selected reference symbol string.

According to the environment recognition system having the above configuration, the evaluation accuracy of the potential risk of the moving body is improved by taking into consideration the presence of a caution needed location where another object such as a traffic participant is likely to appear abruptly in a movable region of the moving body from behind an object (occlusion region) included in the scene. Thereby, the risk to the moving body is reduced further reliably by using the evaluation result of the potential risk.

Preferably the environment recognition system of the present invention further includes a third arithmetic processing element which generates at least one execution command among notification to an operator of the moving body or a person as the moving body or to traffic participants present around the moving body, acceleration suppression of the moving body, and changing speed of the moving body, depending on a level of potential risk to the moving body evaluated by the second arithmetic processing element.

According to the environment recognition system having the above configuration, at least one of the notification, the acceleration suppression of the moving body, and the changing speed of the moving body is executed, thereby reducing risk such as a contact between the moving body and another traffic participant further reliably.

In the environment recognition system of the present invention, preferably the second arithmetic processing element evaluates similarity to the current symbol string generated by the first arithmetic processing element, only with respect to some reference symbol strings whose similarity to the previous symbol string, which has been generated by the first arithmetic processing element, is equal to or higher than a predetermined value or is within a predetermined ranking, among the plurality of reference symbol strings.

According to the environment recognition system having the above configuration, the number of reference scenes whose similarity to the detected scene is calculated is narrowed down out of all reference scenes stored in the database, thereby reducing the arithmetic processing load of the second arithmetic processing element required for similarity calculation and consequently improving the arithmetic processing speed. Thereby, whether the probability that each of the plurality of reference scenes appears is high or low is quickly detected and thus the detection result can be quickly used, thus enabling a reliable reduction in the risk of a contact or the like between the moving body and the traffic participant.

In the environment recognition system of the present invention, preferably, in a case where a difference in similarity to the symbol string generated by the first arithmetic processing element between a first reference symbol string and a second reference symbol string among the plurality of reference symbol strings is equal to or lower than a threshold value, wherein the first reference symbol string holds a first place in the ranking of the similarity and a second reference symbol string holds a second place in the ranking of the similarity, the second arithmetic processing element selects a reference symbol string which has been selected most frequently in a selection history for the latest specified number of times or a reference symbol string selected at the previous time among the first reference symbol string and the second reference symbol string.

According to the environment recognition system having the above configuration, the potential risk of the moving body is evaluated according to the reference scene relatively highly probable to have just appeared around the moving body in the light of the detected scene, and therefore the risk to the moving body is reliably reduced by using the evaluation result.

BRIEF DESCRIPTION OF THE DRAWINGS

FIG. 3A is an explanatory diagram of a first reference scene and FIG. 3B is an explanatory diagram of reference symbol strings describing the first reference scene;

FIG. 4A is an explanatory diagram of a second reference scene and FIG. 4B is an explanatory diagram of reference symbol strings describing the second reference scene;

FIG. 5A is an explanatory diagram of a third reference scene and FIG. 5B is an explanatory diagram of reference symbol strings describing the third reference scene;

FIG. 6A is an explanatory diagram of a fourth reference scene and FIG. 6B is an explanatory diagram of reference symbol strings describing the fourth reference scene;

FIG. 7A is an explanatory diagram of a first detection scene and FIG. 7B is an explanatory diagram of symbol strings describing the first detection scene;

FIG. 8A is an explanatory diagram of a second detection scene and FIG. 8B is an explanatory diagram of symbol strings describing the second detection scene;

FIG. 9A is an explanatory diagram of a third detection scene and FIG. 9B is an explanatory diagram of symbol strings describing the third detection scene;

FIG. 10A is an explanatory diagram of a fourth detection scene and FIG. 10B is an explanatory diagram of symbol strings describing the fourth detection scene;

DESCRIPTION OF THE PREFERRED EMBODIMENTS (Configuration)

Figure 1:
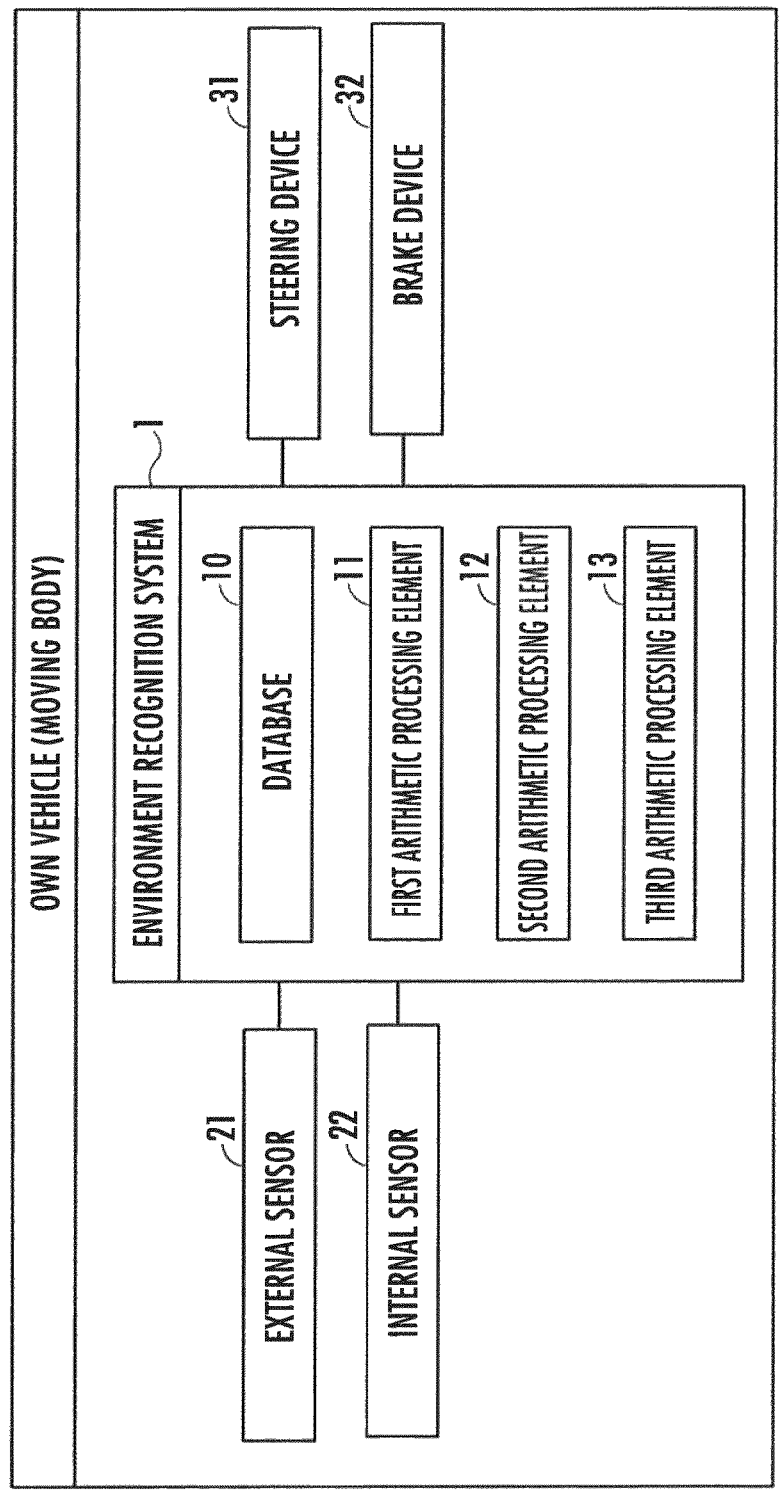
FIG. 1 is a configuration schematic diagram illustrating an environment recognition system as one embodiment of the present invention.

An environment recognition system 1 illustrated in FIG. 1 is composed of a computer (including a CPU [arithmetic processing unit], a ROM, a RAM [storage device], an I/O circuits, and the like) mounted on an own vehicle such as a four-wheeled vehicle, a two-wheeled vehicle, a bicycle, or the like as a moving body which is one of traffic participants. The environment recognition system 1 may be composed of a portable information terminal such as a smartphone or a tablet carried by a pedestrian, a vehicle driver, or a vehicle occupant. The moving body may be a device movable in an autonomous fashion such as a vehicle legged mobile robot. The own vehicle is provided with an external sensor 21, an internal sensor 22, a steering device 31, and a brake device 32 mounted thereon in a manner capable of wired or wireless communication with the environment recognition system 1.

The environment recognition system 1 may be connected to a navigator or an external system which provides road map information based on the position of the own vehicle by communication and is allowed to acquire information on an environment from them.

The external sensor 21, which is a sensor for detecting the situation of the surroundings of the own vehicle, is formed of an imaging device (image sensor), a ranging sensor, a positioning sensor (a GPS and, if needed, a gyro sensor), an outside air temperature sensor or the like. The internal sensor 22 is formed of a sensor for detecting the operating states of the devices, such as the steering device 31 and the brake device 32, mounted on the own vehicle.

The environment recognition system 1 includes a database 10, a first arithmetic processing element 11, a second arithmetic processing element 12, and a third arithmetic processing element 13.

The elements 11 to 13 are configured to perform arithmetic processing assigned thereto described later. The term "the elements are 'configured' to perform the arithmetic processing assigned thereto" means that an arithmetic processing unit such as a CPU constituting each element is "programmed" or "designed" so as to read software in addition to required information from a memory such as the ROM or RAM or a recording medium and to perform the arithmetic processing according to the software for the information. The respective constituent elements may be formed of a common processor (arithmetic processing unit) or may be formed of a plurality of processors capable of mutually communicating.

The database 10 stores reference symbol strings describing each of a plurality of reference scenes. The reference symbol strings describing the reference scenes illustrated in FIGS. 3A, 4A, 5A, and 6A are represented in the forms illustrated in FIGS. 3B, 4B, 5B, and 6B, respectively.

The reference symbol strings differentiated according to different scene names ("bicycle," "right turn," etc.) are divided into large items "Place (environment)," "Traffic Participants," and "Me (moving body)." The large item "Place" is divided into small items "Road Shape," "Pedestrian Crossing," "Slope," "Construction (construction location)," "Crowded," "Weather," and "Day-Night." The large item "Traffic Participants" is divided into small items "Type," "Position," and "Behavior," and a middle item "Other Traffic Participants," and the middle item "Other Traffic Participants" is further divided into small items "Type," "RPosition (relative position)," "Behavior," and "Direction." The number of large items "Traffic Participants" and the number of middle items "Other Traffic Participants" may be increased or decreased depending on the traffic participants included in the same scene. The large item "Me" is divided into small items "Type," "Position," and "Behavior," and a middle item "Other Traffic Participants," and the middle item "Other Traffic Participants" is further divided into small items "Type," "RPosition," "Direction (moving direction)," and "Behavior." The environmental element corresponding to each small item is described by a linguistic symbol or any other symbol such as an arithmetic symbol or a combination thereof, by which the reference scene composed of the environmental elements is described by a series of symbol strings including the symbols.

(Reference Scene 1)

FIG. 3A illustrates a reference scene in which a bicycle is running in such a way as to pass through the right side of a stopped car in the left front of a moving body (own vehicle) running in such a way as to straddle over the median (lane mark) of a straight road including a driving lane and an oncoming lane. According to the reference scene, symbol strings describing the environmental elements corresponding to the respective small items are generated as illustrated in FIG. 3B in accordance with the form described above.

Regarding the large item "Place," the environmental element classified as a small item "Road Shape" is described by a linguistic symbol "Straight line (2)" representing the shape of the road on which the moving body is running. The term "(2)" means the number of lanes (the driving lane and the oncoming lane) where the moving body is allowed to run. For a road, numbers are assigned to lanes from the left-side lane (in the case of left-side traffic, or from the right-side lane in the case of right-side traffic) in order. The environmental element classified as a small item "Speed Range" is described by a linguistic symbol "Residential area" representing an area where the road on which the moving body is running is present. Each of the environmental elements classified as the small items "Pedestrian Crossing," "Slope," "Construction," and "Crowded," respectively, is described by a linguistic symbol "None" according to the absence of the environmental elements corresponding to the small items in the road where the moving body is running. The environmental elements corresponding to the small items "Weather" and "Day-Night" respectively are described by linguistic symbols "Fine" or "Rainy" and "Day" or "Night," respectively.

Regarding the large item "Traffic Participants (First)," the environmental elements corresponding to the small items "Type," "Position," and "Behavior" respectively are described by linguistic symbols "Bicycle," "1-1 Center," and "Moving forward" respectively according to a situation where a bicycle as "Traffic Participants (First)" is running forward approximately in the center of the driving lane ahead of the moving body. The term "1-1" is a symbol representing a lane on which the bicycle is running on the road having a plurality of lanes. Regarding the middle item "Other Traffic Participants," the environmental elements corresponding to the small items "Type" and "RPosition" respectively are described by linguistic symbols "Car" and "Left side" respectively according to a situation where a car as "Traffic Participants (Second)" is stopped on the left side of the bicycle. The "Behavior" is described as "Passing" since the bicycle passes the stopped car (Second). The "Direction" is described as "Same" since the bicycle is oriented in the same direction as the stopped car. Regarding other traffic participants, there is no description relative to the own vehicle.

Regarding the large item "Traffic Participants (Second)," the environmental elements corresponding to the small items "Type," "Position," and "Behavior" respectively are described by linguistic symbols "car," "1-1 Left side," and "Stopped" respectively according to a situation where the car as "Traffic Participants (Second)" is stopped in the left front of the moving body on the driving lane. Regarding the middle item "Other Traffic Participants," the environmental elements corresponding to the small items "Type" and "RPosition" respectively are described by linguistic symbols "Bicycle" and "Right side" according to a situation where the bicycle as "Traffic Participants (First)" is moving forward on the right side of the car. The "Behavior" is described as "NULL" since the car does not perform anything for the bicycle (First). The "Direction" is described as "Same" since the car is oriented in the same direction as the bicycle.

Regarding the large item "Me," the environmental elements classified as the small items "Type," "Position," and "Behavior" respectively are described by linguistic symbols "Car," "On lane mark," and "Moving forward" respectively according to a situation where the car (own vehicle), which is a moving body, is running in such a way as to straddle over the lane mark (median line). Regarding the middle item "Other Traffic Participants (First)," the environmental elements classified as the small items "Type," "RPosition," "Direction," and "Behavior" respectively are described by linguistic symbols "Bicycle," "Left front," "Same," and "Following" according to a situation where the moving body is following the bicycle as "Traffic Participants (First)" running in the same direction in the left front of the moving body. Regarding the middle item "Other Traffic Participants (Second)," the environmental elements classified as the small items "Type," "RPosition," "Direction," and "Behavior" respectively are described by linguistic symbols "Car," "Left front," "Same," and "Passing" respectively according to a situation where the moving body is going to pass the car as "Traffic Participants (Second)" stopped in the left front of the moving body.

Incidentally, the environmental element corresponding to the small item "Position" or "RPosition" of the traffic participants and the moving body may be described by a numeral, a symbol, or a combination thereof representing the longitude and latitude, the azimuth and distance, or the like. The environmental element corresponding to the small item "Behavior" of the traffic participants and the moving body may be described by a numeral, a symbol, or a combination thereof representing the moving direction and speed.

(Reference Scene 2)

FIG. 4A illustrates a reference scene in which a bicycle is running in the left front of a moving body (own body)

running on the driving lane and a car (oncoming car) is running on the oncoming lane. According to the reference scene, symbol strings describing the environmental elements corresponding to the respective small items are generated as illustrated in FIG. 4B in accordance with the form described above.

Regarding the large item "Place," the environmental element classified as the small item "Road Shape" is described by a linguistic symbol "Straight line (1)" representing the shape of the road where the moving body is running. The term "(1)" means the number of lanes where the moving body is allowed to run (only the driving lane).

Regarding the large item "Traffic Participants (Second)," the environmental elements corresponding to the small items "Type," "Position," and "Behavior" respectively are described by linguistic symbols "car," "1-2 Center," and "Moving forward" respectively according to a situation where a car as "Traffic Participants (Second)" is running forward approximately in the center of the oncoming lane ahead of the moving body. Regarding the middle item "Other Traffic Participants," the environmental elements corresponding to the small items "Type" and "RPosition" respectively are described by linguistic symbols "Bicycle" and "Right front" according to a situation where a bicycle as "Traffic Participants (First)" is moving forward in the right front of the car. The "Behavior" is described as "NULL" since none is performed for the car and the "Direction" is described as "Opposite."

Regarding the middle item "Other Traffic Participants (Second)" of the large item "Me," the environmental elements classified as the small items "Type," "RPosition," "Behavior," and "Direction" respectively are described by linguistic symbols "Car," "Right front," "NULL," and "Opposite" respectively according to a situation where the moving body is going to pass by the car as "Traffic Participants (Second)" running on the oncoming lane ahead of the moving body though the moving body and the car have no influence on each other.

(Reference Scene 3)

FIG. 5A illustrates a reference scene in which a bus is stopped in the left front of a moving body (own vehicle) running in such a way as to straddle over the median (lane mark) and a pedestrian is moving forward in the right front of the moving body and in the outside of the oncoming lane. According to the reference scene, symbol strings describing the environmental elements corresponding to the respective small items are generated as illustrated in FIG. 5B in accordance with the form described above.

Regarding the large item "Place," the environmental element classified as the small item "Speed Range" is described by a linguistic symbol "Urban district, Residential area" representing an area where the road on which the moving body is running is present.

Regarding the large item "Traffic Participant (First)," the environmental elements corresponding to the small items "Type," "Position," and "Behavior" respectively are described by linguistic symbols "Bus (or Large vehicle)," "1-1 Left side," and "Stopped" respectively according to a situation where a bus as "Traffic Participants (First)" is stopped on the left side of the driving lane. Regarding the middle item "Other Traffic Participants," environmental elements corresponding to the small items "Type," "RPosition," "Behavior," and "Direction" respectively are described by linguistic symbols "Pedestrian," "Right front," "NULL," and "Opposite" according to a situation where a pedestrian as "Traffic Participants (Second)" is moving forward in the right front of the bus.

Regarding the large item "Traffic Participant (Second)," the environmental elements corresponding to the small items "Type," "Position," and "Behavior" respectively are described by linguistic symbols "Pedestrian," "1-2 Outside," and "Moving forward" respectively according to a situation where a pedestrian as "Traffic Participants (Second)" is moving forward in the outside of the oncoming lane. Regarding the middle item "Other Traffic Participants," environmental elements corresponding to the small items "Type," "RPosition," Behavior," and "Direction" respectively are described by linguistic symbols "Bus," "Left rear," "NULL," and "Opposite" according to a situation where a bus as "Traffic Participants (Second)" is stopped in the left rear of the pedestrian.

(Reference Scene 4)

FIG. 6A illustrates a reference scene in which a truck is running on the oncoming lane in a road at the location straight over to the intersection, viewed from a moving body (own vehicle) present in the vicinity of the intersection (or crossroads). According to the reference scene, symbol strings describing the environmental elements corresponding to the respective small items are generated as illustrated in FIG. 6B in accordance with the form described above.

Regarding the large item "Place," the environmental element classified as the small item "Road Shape" is described by a linguistic symbol "Intersection (4)" representing the shape of the road on which the moving body (own vehicle) is running. The term "(4)" indicates the number of lanes where the moving body is allowed to run including the current driving lane among the lanes leading to the intersection. The environmental element classified as the small item "Speed Range" is described by a linguistic symbol "Suburb" representing an area where the road on which the moving body is running is present. The environmental element classified as "Pedestrian Crossing" is described by symbols or numerals "1, 2, 3, 4" according to a situation where four pedestrian crossings are present at the intersection.

Regarding the large item "Traffic Participant (First)," the environmental elements corresponding to the small items "Type," "Position," and "Behavior" respectively are described by linguistic symbols "Truck/Large vehicle," "3-2 Center," "and "Moving forward" respectively according to a situation where a truck as "Traffic Participants (First)" is running approximately in the center of the oncoming lane of the road at the intersection ahead of the moving body (own vehicle). The term "3" of "3-2" means a road straight over to the intersection and "2" means the oncoming lane. Regarding the middle item "Other Traffic Participants," the environmental elements corresponding to the small items "Type," "RPosition," "Behavior," and "Direction" respectively are described as "NULL."

In addition, the database 10 may store reference symbol strings describing each of a plurality of reference scenes different from the reference scenes illustrated in FIGS. 3A, 4A, 5A, and 6A. Similarly to FIG. 6B, the environmental elements related to the moving body may be described as environmental elements of any other traffic participant by symbols, regarding the traffic participant other than the moving body in accordance with the form illustrated in each of FIGS. 3B, 4B, and 5B. Although the description of the environmental elements corresponding to the respective small items as illustrated in each of FIGS. 3B, 4B, 5B, and 6B includes Japanese linguistic symbols, the description may include synonymous linguistic symbols in other languages such as English or German. The description of the environmental elements may include a combination between a linguistic symbol and a mathematical or scientific symbol, a connecting symbol, a musical symbol, a parenthesis symbol or any other symbol in addition to a numeral. A reference scene (or environmental elements constituting the reference scene) may be described by at least one of the plurality of synonymous or similar linguistic symbols among the linguistic symbols in English or the like.

(Functions)

The functions of the environment recognition system 1 having the above configuration will be described below. The first arithmetic processing element 11 detects a scene around the moving body (FIG. 2: STEP 02).

Specifically, the speed range (the attribute of an area where a running road is present), the road shape, the presence or absence of a pedestrian crossing, the presence or absence of a slope, and the presence or absence of a structure among the environmental elements constituting the scene around the moving body are detected by referring to road map information stored in the storage device of the moving body on the basis of the position of the moving body measured by the GPS. Alternatively, a result of recognizing the road shape may be used for the detection. The construction location, whether the traffic is crowded (the presence or absence of traffic congestion), the weather, and the day or night among the environmental elements may be detected by analyzing the pixel values (luminosity, etc.) of a captured image acquired by an imaging device constituting the external sensor 21. Some or all of the construction location, whether the traffic is crowded, the weather, and the day or night may be detected by transmitting data representing the environmental elements from a server to a computer constituting the environment recognition system 1.

The type of a traffic participant is detected by extracting an image region corresponding to an object from the image captured by the imaging device constituting the external sensor 21 on the basis of pixel values and performing pattern matching with the image region as a target. The type of a traffic participant may be detected by direct communication or indirect communication via a base station with an information terminal mounted on a vehicle (a four-wheeled vehicle, a two-wheeled vehicle, a bicycle, or the like) as a traffic participant or an information terminal carried by a vehicle occupant.

The relative position of a traffic participant to the lane (driving lane) is detected as the relative position of the center of gravity of the image region corresponding to the traffic participant with respect to the image region corresponding to the lane included in the image captured by the imaging device. The image region corresponding to the lane in the captured image is detected by extracting a lane mark defining the right and left of the lane. The position of the traffic participant in the moving body coordinate system (the coordinate system with the position and attitude fixed to the moving body) is measured by using the radar or parallax of the stereo camera mounted on the moving body. The position of the traffic participant in the moving body coordinate system may be calculated on the basis of the coordinate values in the world coordinate system detected by the communication with the information terminal accompanying the traffic participant and the coordinate values in the world coordinate system of the moving body. The relative position of one traffic participant to the other traffic participant is detected as a relative position of the traffic participant in the moving body coordinate system.

The behavior (speed) of the traffic participant is measured on the basis of a rate of change in the size of the image region corresponding to the traffic participant in the captured image in addition to the speed of the moving body. Alternatively, the measurement may be performed by using the estimated speed as a result of tracking based on the relative position and relative angle. The behavior of the traffic participant may be measured on the basis of the time-series change in the position of the traffic participant in the moving body coordinate system measured as described above.

The type of the moving body is detected by reading an identifier stored in the storage device of the moving body. The position of the moving body in a lane is detected on the basis of the position of the image region corresponding to the lane in the captured image acquired by the imaging device mounted on the moving body. The position of the moving body in the lane may be detected by referring to the road map information stored in the storage device of the moving body on the basis of the position of the moving body measured by the GPS. The behavior of the moving body is detected on the basis of the speed measured by a speed sensor constituting the internal sensor 22 and further the operating states of the on-vehicle devices such as a direction indicator, the steering device 31, and the brake device 32 detected by the internal sensor 22.

Thus, for example, the scenes respectively illustrated in FIGS. 7A, 8A, 9A, and 10A are detected in time series. FIG. 7A illustrates a scene where a bicycle is running in the left front side of a driving lane, viewed from a moving body running on the driving lane, and a car is stopped further ahead of the bicycle. FIG. 8A illustrates a scene where a bicycle is running in the front and approximately center of the driving lane, viewed from a moving body running on the driving lane, and a car is stopped in the left front of the bicycle, while another car is running on the oncoming lane. FIG. 9A illustrates a scene where a bicycle is running in the front right side of the driving lane, viewed from a moving body running on the driving lane, and a car is stopped in the left front of the bicycle, while another car is running on the oncoming lane. FIG. 10A illustrates a scene where a bicycle is running in the front right side of the driving lane, viewed from a moving body which has decelerated almost to be stopped on the driving lane, and a car is stopped in the left front of the bicycle, while another car is running on the oncoming car.

Figure 2:
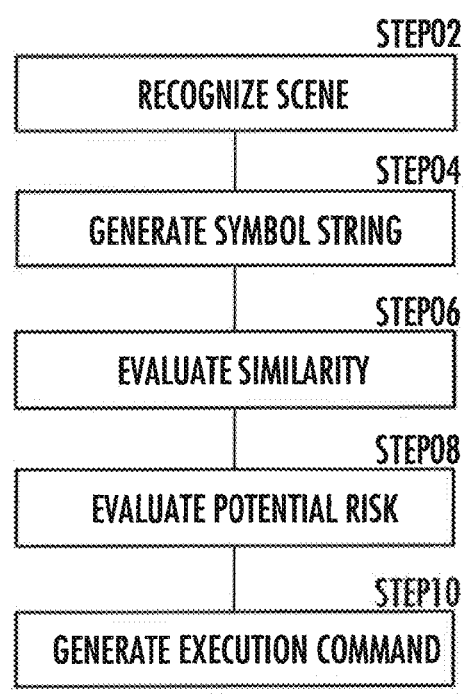
FIG. 2 is a function schematic diagram illustrating an environment recognition system as one embodiment of the present invention.

The first arithmetic processing element 11 generates symbol strings for describing each scene as an environment recognition result (FIG. 2: STEP 04).

(Environment Recognition Result 1)

For example, according to the scene illustrated in FIG. 7A, the first arithmetic processing element 11 generates symbol strings describing the environmental elements corresponding to the respective small items as illustrated in FIG. 7B in accordance with the form described above.

Regarding the large item "Place," the environmental element classified as the small item "Road Shape" is described by a linguistic symbol "Straight line (1)" representing the shape of a road where a moving body is running. The environmental elements classified as the small items "Pedestrian Crossing," "Slope," "Construction," and "Crowded" respectively are described by a linguistic symbol "None" according to a situation where no environmental elements corresponding to the small items are present in the road on which the moving body is running. In the small item "Speed Range," Residential area, Urban district, Suburban road, or the like in the road map information is entered. The environmental elements corresponding to the small items "Weather" and "Day-Night" respectively are described by linguistic symbols "Fine" and "Day" respectively.

Regarding the large item "Traffic Participant (First)," the environmental elements corresponding to the small items "Type," "Position," and "Behavior" respectively are described by linguistic symbols "Bicycle," "1-1 Left side," and "Moving forward" respectively according to a situation where the bicycle as "Traffic Participants (First)" is running forward in the left front of the moving body on the driving lane. If the information on the traffic participant is not acquired in a pattern matching result or communication, each environmental element is described as "NULL." Regarding the middle item "Other Traffic Participants," the environmental elements corresponding to the small items "Type," "RPosition," "Behavior," and "Direction" respectively are described by linguistic symbols "Car," "Front," "NULL," and "Same" according to a situation where a car as "Traffic Participants (Second)" is stopped in front of the bicycle.

Regarding the large item "Traffic Participant (Second)," the environmental elements corresponding to the small items "Type," "Position," and "Behavior" respectively are described by linguistic symbols "Car," "1-1 Left side," and "Stopped" respectively according to a situation where a car as "Traffic Participants (Second)" is stopped in the left front side of the driving lane. Regarding the middle item "Other Traffic Participants," the environmental elements corresponding to the small items "Type," "RPosition," "Behavior," and "Direction" respectively are described by linguistic symbols "Bicycle," "Rear," "NULL," and "Same" according to a situation where a bicycle as "Traffic Participants (First)" is moving forward in the rear of the car.

Regarding the large item "Me," the environmental elements corresponding to the small items "Type," "Position," and "Behavior" respectively are described by linguistic symbols "Car," "1-1 Center," "and "Moving forward" respectively according to a situation where a car (own vehicle) as a moving body is running forward approximately in the center of the driving lane. Regarding the middle item "Other Traffic Participants (First)," the environmental elements classified as the small items "Type," "RPosition," "Direction (moving direction)," and "Behavior" respectively are described by linguistic symbols "Bicycle," "Left front," "Same," and "Following" according to a situation where the moving body is following a bicycle as "Traffic Participants (First)" running in the left front of the moving body in the same direction. Regarding the middle item "Other Traffic Participants (Second)," the environmental elements classified as the small items "Type," "RPosition," and "Behavior" respectively are described by linguistic symbols "Car," "Left front," "and "NULL" according to a situation where the moving body does not behave particularly at this time point for "Traffic Participants (Second)" stopped in the left front of the moving body.

(Environment Recognition Result 2)

According to the scene illustrated in FIG. 8A, symbol strings describing the environmental elements corresponding to the respective small items are generated as illustrated in FIG. 8B in accordance with the form described above. Compared to the scene in FIG. 7A, the scene in FIG. 8A differs from the scene in FIG. 7A in that a car running on the oncoming lane appears. Thus, according to the difference, the descriptions enclosed by thick frames in FIG. 8B are different from the descriptions in FIG. 7B.

Specifically, regarding the large item "Traffic Participant (Third)," the environmental elements corresponding to the small items "Type," "Position," and "Behavior" respectively are described by linguistic symbols "Car," "1-2 Center," "and "Moving forward" respectively according to a situation where a car as "Traffic Participants (Third)" is moving forward approximately in the center of the oncoming lane. Regarding the middle item "Other Traffic Participants (First)," the environmental elements corresponding to the small items "Type," "RPosition," "Behavior," and "Direction" respectively are described by linguistic symbols "Bicycle," "Right front," "NULL," and "Opposite" according to a situation where a bicycle as "Traffic Participants (First)" is running forward in the right front of the car. Regarding the middle item "Other Traffic Participants (Second)," the environmental elements corresponding to the small items "Type," "RPosition," "Behavior," and "Direction" respectively are described by linguistic symbols "Car," "Right front," "NULL," and "Opposite" according to a situation where a car as "Traffic Participants (Second)" is stopped in the right front of the car.

Regarding the large item "Traffic Participants (First)," the environmental element corresponding to the small item "Position" is described by a linguistic symbol "1-1 Center" according to a situation where a bicycle as "Traffic Participants (First)" is moving forward approximately in the center of the driving lane. Regarding the middle item "Other Traffic Participants (Third)," the environmental elements corresponding to the small items "Type," "RPosition," "Behavior," and "Direction" respectively are described by linguistic symbols "Car," "Right front," "NULL," and "Opposite" according to a situation where a car as "Traffic Participants (Third)" is running forward in the right front of the bicycle.

Regarding the middle item "Other Traffic Participants (Third)" of the large item "Traffic Participants (Second)," the environmental elements corresponding to the small items "Type," "RPosition," "Behavior," and "Direction" respectively are described by linguistic symbols "Car," "Right front," "NULL," and "Opposite" according to a situation where a car as "Traffic Participants (Third)" is running forward in the right front of the car as "Traffic Participants (Second)."

Regarding the middle item "Other Traffic Participants (Third)" of the large item "Me," the environmental elements divided as the small items "Type," "RPosition," and "Behavior" respectively are described by linguistic symbols "Car," "Right front," "and "NULL" according to a situation where the moving body does not behave particularly at this time point for the car (oncoming car) as "Traffic Participants (Third)" running in the right front of the moving body.

(Environment Recognition Result 3)

According to the scene illustrated in FIG. 9A, symbol strings describing the environmental elements corresponding to the respective small items are generated as illustrated in FIG. 9B in accordance with the form described above. Compared to the scene in FIG. 8A, the scene in FIG. 9A differs from the scene in FIG. 8A in that the moving body and the bicycle (Traffic Participants [First]) running on the driving lane shifted to the right. Thus, according to the difference, the descriptions enclosed by thick frames in FIG. 9B are different from the descriptions in FIG. 8B.

Specifically, regarding the large item "Traffic Participants (First)," the environmental element corresponding to the small item "Position" is described by a linguistic symbol "1-1 Right side" according to a situation where a bicycle as "Traffic Participants (First)" is moving forward on the right side of the driving lane. Regarding the large item "Me," the environmental element divided as the small item "Position" is described by a linguistic symbol "1-1 Right side" according to a situation where the moving body is running on the right side of the driving lane. Regarding the car in the middle item "Other Traffic Participants (Second)" of the large item "Traffic Participants," the small item "Behavior" is described as "Passing" since the bicycle as "Traffic Participants (First)" passes the stopped car as "Traffic Participants (Second)."

(Environment Recognition Result 4)

According to the scene illustrated in FIG. 10A, symbol strings describing the environmental elements corresponding to the respective small items are generated as illustrated in FIG. 10B in accordance with the form described above. Compared to the scene in FIG. 9A, the scene in FIG. 10A differs from the scene in FIG. 9A in that the moving body decelerated and stopped. Thus, according to the difference, the descriptions enclosed by thick frames in FIG. 10B are different from the descriptions in FIG. 9B.

Specifically, the car in the middle item "Other Traffic Participants (Second)" of the large item "Traffic participants (First)" is located to the left of the bicycle and therefore the small item "RPosition" is described as "Left." Since the bicycle in the middle item "Other Traffic Participants (First)" of the large item "Traffic Participants (Second)" is located to the right of the car, the item is described as "Right." Regarding the large item "Me," the environmental element divided as the small item "Behavior" is described by a linguistic symbol "Stopped" according to a situation where the moving body is stopped on the right side of the driving lane.

The second arithmetic processing element 12 evaluates the similarity between a symbol string as an environment recognition result acquired by the first arithmetic processing element 11 and a reference symbol string stored in the database 10 (FIG. 2: STEP 06). Specifically, an editing distance between the symbol string and the reference symbol string is calculated: the shorter the editing distance is, the similarity is evaluated to be higher; and the longer the editing distance is, the similarity is evaluated to be lower. In the case where a part of each of the symbol string and the reference symbol string is described by a numeral, the greater the total sum or the weighted linear sum of the deviation of the numeral and the editing distance of other symbols is, the similarity may be evaluated to be higher. If the numeral indicates a relative speed or distance related to the possibility of contact between the moving body and a traffic participant different therefrom, the weight coefficient of the deviation of the numeral may be set to a value greater than the weight coefficient of the editing distance of the symbol.

Table 1 lists calculation results of the editing distances to the reference symbol strings (See FIGS. 3B, 4B, 5B, and 6B) corresponding to the reference scenes 1 to 4 (FIGS. 3A, 4A, 5A, and 6A), for example, with respect to the environment recognition results 1 to 4, respectively. The editing distance is calculated according to the following relational expression (1).

Editing distance=1−{Leveneshtein distance(Environment recognition result, reference scene)}÷Max (Environment recognition result size, reference scene size) (The term "size" means the total number of texts.) (1)

The Leveneshtein distance may be replaced by a Jaccard distance. Furthermore, with the symbol strings written in XML or the like and the items as tags constituting a tree structure, the calculation may be made by using the similarity in a structure and the similarity in the editing distance in the structure by using a method described in the reference literature ("Efficient Similarity Searching for XML Data based on Similarity in Text and Structure," Koyanagi, Amagasa, Kitagawa, DEIM Forum, 2014, D7-5).

TABLE 1

|  | Reference scene 1 Bicycle | Reference scene 2 Head-on collision | Reference scene 3 Pedestrian | Reference scene 4 Right turn |
|---|---|---|---|---|
| Environment recognition result 1 | 0.69437 | 0.67223 | 0.66824 | 0.42083 |
| Environment recognition result 2 | 0.46988 | 0.47968 | 0.47062 | 0.42875 |
| Environment recognition result 3 | 0.47383 | 0.48186 | 0.47042 | 0.42586 |
| Environment recognition result 4 | 0.47403 | 0.48037 | 0.46964 | 0.42624 |

From Table 1, the following is understood. The scene corresponding to the environment recognition result 1 (See FIG. 7A) is most similar to the reference scene 1 (See FIG. 3A). The scene corresponding to the environment recognition result 1 (See FIG. 7A) is also similar to the reference scene 2 (See FIG. 4A) and the similarity is relatively high. Scenes corresponding to the environment recognition results 2 to 4 respectively (See FIGS. 8A, 9A, and 10A) are most similar to the reference scene 2 (See FIG. 4A).

The second arithmetic processing element 12 selects the reference symbol string highest in similarity and evaluates the potential risk of the moving body on the basis of the selected one reference symbol string (FIG. 2: STEP 08). Specifically, actions for a reference scene are previously defined in the database 10 on the basis of at least some symbols constituting a reference symbol string. Specifically, execution commands such as "Suppress acceleration," "Decelerate," "Wait for passage of oncoming car," and the like are defined as rules. In the case where the current operation is continued or an operation for increasing the speed is performed, a deceleration device is activated within a range where a brake is not practically put on the vehicle. Then, in the case where it is determined that the possibility of contact is apparently high, a brake is put on the vehicle. Otherwise, in the case where it is determined that the reduction in the possibility of contact is insufficient in the contact avoidance with steering for reducing risk, the steering amount is increased by control. TTC is calculated for the degree of contact risk and the deceleration is decided according to the execution commands of the above rule.

Subsequently, the third arithmetic processing element 13 generates at least either one execution command out of the notification to the operator of the moving body or to the traffic participants around the moving body and the speed change of the moving body, depending on the degree of potential risk evaluated by the second arithmetic processing element 12 (FIG. 2: STEP 10).

Specifically, in the case where a numeric value indicating a potential risk is included in a first specification range, the third arithmetic processing element 13 generates a command by which both of the braking and steering of the moving body are performed. In response thereto, the operations of the steering device 31 and the brake device 32 mounted on the moving body are controlled to reduce the risk. In the case where a numeric value indicating the potential risk is included in a second specification range having a value lower than the lower limit of the first specification range as an upper limit, the third arithmetic processing element 13 generates a command by which either one of the braking and steering of the moving body is performed. In response thereto, the operation of one of the steering device 31 and the brake device 32 mounted on the moving body is controlled to reduce the risk. In the case where a numeric value indicating the potential risk is included in a third specification range having a value lower than the lower limit of the second specification range as an upper limit, the third arithmetic processing element 13 generates a command by which the notification of the potential risk is performed. In response thereto, the operation of a notification device mounted on the moving body is controlled, by which a notification is output in a form detectable by a person through vision, hearing, or touch or a combination thereof.

Advantageous Effects

According to the environment recognition system 1 of the present invention, whether the probability that each of the plurality of reference scenes described by a plurality of reference symbol strings has just appeared is high or low is detected according to the evaluation result of similarity to the symbol strings as an environment recognition result (See Table 1 and FIG. 2: STEP 06). Thereby, in the light of the states of the traffic participants or the like as environmental elements constituting a reference scene having the probability of appearance around a moving body, risk such as a contact between the moving body and the traffic participant is reliably reduced. Since the potential risk of the moving body is evaluated according to the reference scene which is relatively highly probable to appear around the moving body in the light of the detected scene out of the plurality of reference scenes, the risk to the moving body is reliably reduced by using the evaluation result (See FIG. 2: STEP 08). Due to the generation of at least one execution command out of the notification to the operator of the moving body or a person as a moving body or to the traffic participants around the moving body and the speed change of the moving body depending on the degree of potential risk to the moving body, the risk such as a contact between the moving body and other traffic participants or the like is further reliably reduced (See FIG. 2: STEP 10). In the case where a traffic participant cannot be surely recognized due to a change in environment such as, for example, a change in brightness, a potential risk is able to be measured on the basis of the similarity to the reference scene as a whole even if the "Type" is unknown. Even if the number of traffic participants appearing in the reference scene varies, the environment recognition system is able to notify the operator of at least a fact that a potential risk is likely to occur at a time point earlier than the detection of possibility of contact so as to avoid a dangerous situation, as long as it is found that the reference scene is present as a subset within the environment recognition result of the environment recognition system or contrarily as long as it is found that the environment recognition result is present as a subset of the reference scene.

Other Embodiments of Present Invention

The database 10 stores a large number of reference symbol strings. Therefore, if the similarity between a symbol string and all reference symbol strings is calculated every time the symbol string is generated, the arithmetic processing load on the second arithmetic processing element 12 and time for the calculation increase enormously, which may lead to a delay in generation of execution commands described later. Therefore, the similarity to the current symbol string may be calculated only with respect to a predetermined number of reference symbol strings whose similarity to the previous symbol string is a predetermined value or higher or whose ranking in the similarity is within a predetermined ranking out of all reference symbol strings stored in the database 10. For example, the editing distance to the environment recognition result 2 may be calculated only with respect to the reference symbol strings 1 and 2 whose ranking in ascending order for the editing distance to the environment recognition result 1 is in the top two (See Table 1).

According to the environment recognition system having the above configuration, the number of reference scenes whose similarity to the detected scene is calculated is narrowed down, thereby reducing the arithmetic processing load on the second arithmetic processing element 12 required for the similarity calculation and consequently improving the arithmetic processing speed. Thereby, whether the probability that each of the plurality of reference scenes has just appeared is high or low is quickly detected and thus the detection result can be quickly used, thus enabling a reliable reduction of the risk of a contact or the like between a moving body and a traffic participant.

The second arithmetic processing element 12 determines whether or not a difference in similarity between the first reference symbol string and the second reference symbol string out of all reference symbol strings stored in the database 10 is equal to or less than a threshold value, wherein the first reference symbol string holds the first place in the ranking of the similarity to the symbol string and the second reference symbol string holds the second place in the ranking of the similarity. If the difference is determined to be equal to or less than the threshold value as the result, the reference symbol string which has been selected most frequently in a selection history for the latest specified number of times or the reference symbol string selected at the previous time may be selected out of the first and second reference symbol strings.

According to the environment recognition system having the above configuration, the potential risk of the moving body is evaluated according to the reference scene relatively highly probable to have just appeared around the moving body in the light of the detected scene, and therefore the risk to the moving body is reliably reduced by using the evaluation result.

The first arithmetic processing element 11 may extract a part of an object, which is present in a movable region of the moving body in the scene, as a caution needed location, and the second arithmetic processing element 12 may evaluate a potential risk on the basis of the extracted caution needed location, in addition to the reference scene.

Specifically, first, the captured image acquired by the imaging device constituting the external sensor 21 is converted to a bird's-eye view in the own vehicle coordinate system. For the conversion, distance information is used as pixel values of the pixels constituting the captured image. In the case where the imaging device is a stereo camera, a parallax between the standard image and the reference image is used to give the distance information, as pixel values, to the pixels constituting the standard image. If the imaging device is a single two-dimensional image sensor, a three-dimensional image sensor is used together, by which the distance information is given, as pixel values, to the pixels constituting the two-dimensional image according to the method disclosed in, for example, Japanese Patent Application Laid-Open No. 2011-033497. Moreover, the external sensor 21 is replaced by a device capable of detecting three-dimensional depth information in pixels such as, for example, a range finder, a TOF camera, or the like.

Figure 11A:
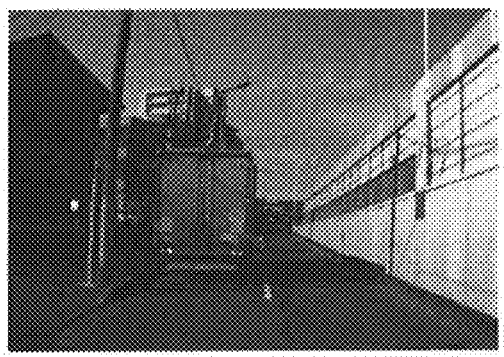
FIG. 11A is an explanatory diagram of a first example of a detection scene.
Figure 11B:
FIG. 11B is an explanatory diagram of the first example of a bird's-eye view as a conversion result of the detection scene.
Figure 12A:
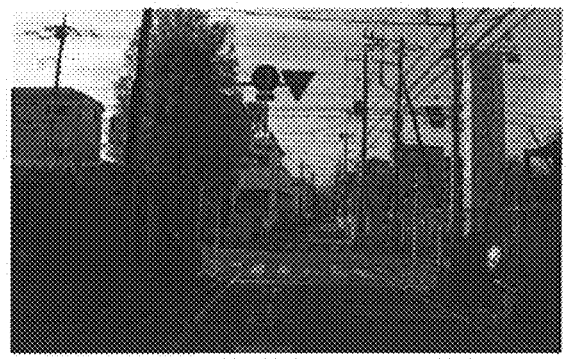
FIG. 12A is an explanatory diagram of a second example of a detection scene.
Figure 12B:
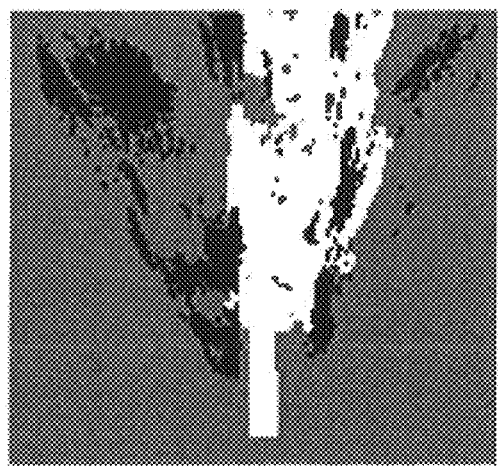
FIG. 12B is an explanatory diagram of the second example of a bird's-eye view as a conversion result of the detection scene.

Thereby, a captured image, for example, as illustrated in each of FIGS. 11A and 12A is converted to the bird's-eye view as illustrated in each of FIGS. 11B and 12B. In the bird's-eye view, the white part corresponds to a place detected to be a road surface (corresponding to a movable region of the vehicle), the black part corresponds to a place where it is detected that a traffic participant such as a truck or a structure such as a utility pole, a building, or a sound isolation wall is present, and the gray part corresponds to a place which is other than a subject of detection. The location where a road surface is present in the captured image is detected on the basis of the hue, saturation, and luminosity as pixel values of the pixels constituting the captured image. Alternatively, the lane width information or shape information included in the road map information may be used for the detection.

Figure 11C:
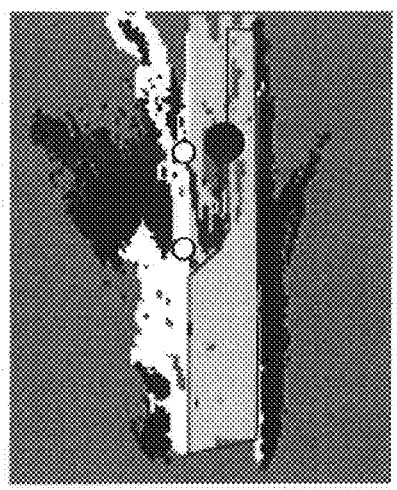
FIG. 11C is an explanatory diagram of the first example of a result of extracting caution points from the bird's-eye view.
Figure 12C:
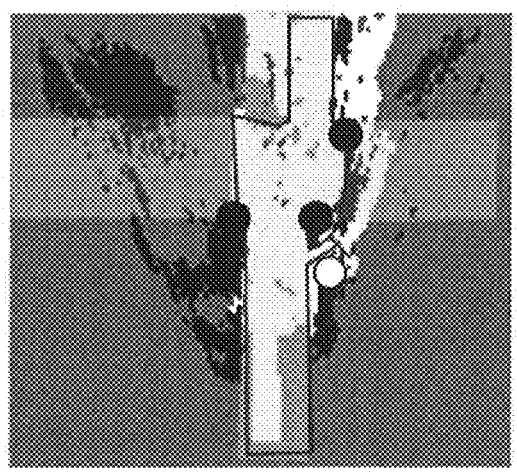
FIG. 12C is an explanatory diagram of the second example of a result of extracting caution points from the bird's-eye view.

Locations present on the deep side when viewed from the own vehicle are extracted from the black part representing a traffic participant or a structure in the bird's-eye view illustrated in each of FIGS. 11C and 12C (See the filled circle and the open circle). The road image included in the road map information stored in the storage device mounted on the moving body is superposed on the bird's-eye view and the location present in the overlapping part out of the locations extracted as described above is extracted as a caution needed location (See an open circle in FIGS. 11C and 12C). In the superposition of the road image on the bird's-eye view, a result of measuring the position of the own vehicle (the coordinate values in the world coordinate system) is used. The greater the number of caution needed locations is, the potential risk is evaluated to be higher. Alternatively or additionally, as a caution needed location is closer to the own vehicle, the potential risk is evaluated to be higher.

According to the environment recognition system 1 having the above configuration, the evaluation accuracy of the potential risk of the moving body is improved by taking into consideration the presence of the caution needed location where another object such as a traffic participant is likely to appear abruptly in a movable region of the moving body from behind an object (occlusion region) included in the scene. Thereby, the risk to the moving body is reduced further reliably by using the evaluation result of the potential risk.

DESCRIPTION OF THE REFERENCE NUMERALS

1 Environment recognition system
10 Database
11 First arithmetic processing element
12 Second arithmetic processing element
13 Third arithmetic processing element
21 External sensor
22 Internal sensor
31 Steering device
32 Brake device

What is claimed is:
1. An environment recognition system comprising:
a database which stores each of a plurality of reference symbol strings describing a state of an environmental element constituting each of a plurality of scenes assumed to be around a moving body;
a first arithmetic processing element which detects a scene around the moving body and generates a symbol string describing a state of an environmental element constituting the scene; and
a second arithmetic processing element which evaluates similarity between the symbol string generated by the first arithmetic processing element and each of the plurality of reference symbol strings stored in the database,
wherein, in a case where a difference in similarity to the symbol string generated by the first arithmetic processing element between a first reference symbol string and a second reference symbol string among the plurality of reference symbol strings is equal to or lower than a threshold value, wherein the first reference symbol string holds a first place in ranking of the similarity and a second reference symbol string holds a second place in the ranking of the similarity, the second arithmetic processing element selects a reference symbol string which has been selected most frequently in a selection history for a latest specified number of times or a reference symbol string selected at a previous time among the first reference symbol string and the second reference symbol string.

2. The environment recognition system according to claim 1, wherein the second arithmetic processing element selects a reference symbol string having a highest current value of the similarity or a highest cumulative value for latest specified number of times as a current reference symbol string and calculates potential risk of the moving body based on at least some symbols constituting the selected reference symbol string according to a data table stored in the database or a specification rule defined by a function.

3. The environment recognition system according to claim 2, wherein the second arithmetic processing element evaluates the potential risk of the moving body based on a symbol describing at least one of a type, position, and behavior of a traffic participant as the environmental element as the at least some symbols.

4. The environment recognition system according to claim 2, wherein:
the first arithmetic processing element extracts a location on a deep side when viewed from the moving body, as a caution needed location, out of objects present in a movable region of the moving body or adjacent thereto in the scene; and
the second arithmetic processing element evaluates the potential risk of the moving body based on at least one of positions and a number of caution needed locations extracted by the first arithmetic processing element in addition to the selected reference symbol string.

5. The environment recognition system according to claim 2, further comprising a third arithmetic processing element which generates at least one execution command among notification to an operator of the moving body or a person as the moving body or to traffic participants present around the moving body, acceleration suppression of the moving body, steering control, and changing speed of the moving body, depending on a degree of potential risk to the moving body evaluated by the second arithmetic processing element.

6. The environment recognition system according to claim 1, wherein the second arithmetic processing element evaluates the similarity to the current symbol string generated by the first arithmetic processing element, only with respect to some reference symbol strings whose similarity to a previous symbol string, which has been generated by the first arithmetic processing element, is equal to or higher than a predetermined value or is within a predetermined ranking, among the plurality of reference symbol strings.

7. An environment recognition method comprising:
- a first arithmetic processing step for detecting a scene around a moving body and then generating a symbol string describing a state of an environmental element constituting the scene; and
- a second arithmetic processing step for evaluating similarity between the symbol string generated in the first arithmetic processing step and each of a plurality of reference symbol strings describing a state of an environmental element constituting each of a plurality of scenes assumed to be around the moving body stored in a database; and
- a third arithmetic processing step for, in a case where a difference in similarity to the symbol string generated in the first arithmetic processing step between a first reference symbol string and a second reference symbol string among the plurality of reference symbol strings is equal to or lower than a threshold value, wherein the first reference symbol string holds a first place in ranking of the similarity and a second reference symbol string holds a second place in the ranking of the similarity, selecting a reference symbol string which has been selected most frequently in a selection history for a latest specified number of times or a reference symbol string selected at a previous time among the first reference symbol string and the second reference symbol string.

* * * * *